(12) United States Patent
Strandborg et al.

(10) Patent No.: US 12,326,566 B1
(45) Date of Patent: Jun. 10, 2025

(54) SECONDARY REFLECTION COMPENSATION

(71) Applicant: Distance Technologies Oy, Helsinki (FI)

(72) Inventors: Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/020,182

(22) Filed: Jan. 14, 2025

Related U.S. Application Data

(63) Continuation-in-part of application No. 18/818,876, filed on Aug. 29, 2024, now Pat. No. 12,260,506.

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/0132* (2013.01); *G02B 2027/0138* (2013.01); *G02B 2027/014* (2013.01)

(58) Field of Classification Search
CPC ............ G02B 27/0172; G02B 27/0093; G02B 2027/0132; G02B 2027/0138; G02B 2027/014; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0134; G02B 2027/0136; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163;
(Continued)

(56) References Cited

U.S. PATENT DOCUMENTS

2019/0072767 A1* 3/2019 Vallius ................. H04N 9/646
2021/0278664 A1* 9/2021 Tanaka ............... G02B 27/0101

* cited by examiner

*Primary Examiner* — Henry Duong
(74) *Attorney, Agent, or Firm* — Ziegler IP Law Group, LLC.

(57) ABSTRACT

For a region of an image, a portion of a semi-reflective surface of an optical combiner from which light rays of the given region are reflected towards eyes of a user during display via a display unit is determined. For this portion of the semi-reflective surface, a secondary reflection intensity of light rays of another region of the image that undergo secondary reflection from a portion of another surface of the optical combiner is determined. A minimum intensity level of pixels in the image is increased. Intensity values of pixels in said region of the image are adjusted based on the secondary reflection intensity. The image is displayed via the display unit, thereby producing a synthetic light field. The optical combiner reflects the synthetic light field towards the eyes, whilst optically combining the synthetic light field with a real-world light field.

20 Claims, 2 Drawing Sheets

(58) Field of Classification Search
CPC .... G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC .......................................................... 359/630
See application file for complete search history.

SECONDARY REFLECTION COMPENSATION

CROSS-REFERENCE TO RELATED APPLICATIONS

This application is a continuation-in-part of U.S. patent application Ser. No. 18/818,876, titled "AUGMENTING REALITY USING MULTISCOPIC DISPLAY HAVING ADAPTIVE CROSSTALK COMPENSATION" and filed on Aug. 29, 2024, which is incorporated herein by reference.

TECHNICAL FIELD

The present disclosure relates to systems for augmenting reality that incorporate secondary reflection compensation. The present disclosure also relates to methods for augmenting reality that incorporate secondary reflection compensation.

BACKGROUND

Augmented reality displays (such as heads-up displays (HUDs), head-mounted displays (HMDs), or similar) typically suffer from a phenomenon called "double reflection." Due to this phenomenon, some light rays emanating from a display unit reflect towards a user's eyes from a semi-reflective surface (namely, a user-facing surface) of an optical combiner, thereby undergoing a primary reflection from the semi-reflective surface. At the same time, other light rays get refracted inside the optical combiner and reflect towards the user's eyes from an opposite surface (namely, a real-world-facing surface) of the optical combiner, thereby undergoing a secondary reflection from the opposite surface. Due to refraction, the secondary reflection appears to be incoming towards the user's eyes from a location slightly different from that of the primary reflection. This causes a ghosting artifact, which negatively impacts the clarity and contrast of displayed images, leading to user discomfort.

To mitigate such ghosting artifacts, conventional optical combiners often employ anti-reflective coatings on their real-world-facing surfaces. These anti-reflective coatings are designed to reduce the intensity of secondary reflections. However, the problem of double reflection persists even with anti-reflective coatings, as no coating achieves 100 percent efficiency. Additionally, wear and tear over time, such as scratches or environmental degradation, can further reduce the effectiveness of these anti-reflective coatings, leading to inconsistent performance over the lifetime of the optical combiner.

Another conventional technique for mitigating ghosting artifacts in conventional HUDs involves a specially crafted windshield geometry. In this technique, a lamination layer between glass sheets of a windshield is made progressively thicker towards the top of the windshield. As a result, the secondary reflection (responsible for the ghosting artifact) is moved to coincide with the primary reflection, thereby hiding the secondary reflection behind the primary reflection. However, this conventional technique has several drawbacks. First, it works only for a single predefined viewing position. Viewing positions that deviate from this predefined viewing position exhibit progressively worse image quality as the primary reflection and the secondary reflection become misaligned. Second, this technique is effective only within a narrow area ("sweet spot") on the windshield's surface. Third, it works for a single predefined direction, typically vertical. Consequently, it addresses only vertically aligned secondary reflections, which is a limitation given the difficulty of constructing a wedge to accommodate a concave shape of typical windshields.

Therefore, in light of the foregoing discussion, there exists a need to overcome the aforementioned drawbacks.

SUMMARY

The present disclosure seeks to provide a system and a method for augmenting reality that is capable of compensating for secondary reflection. The aim of the present disclosure is achieved by a system and a method for augmenting reality in which a minimum intensity level of pixels in an image is increased and intensity values of pixels in a given region of the image are adjusted based on a secondary reflection intensity determined for the given region, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
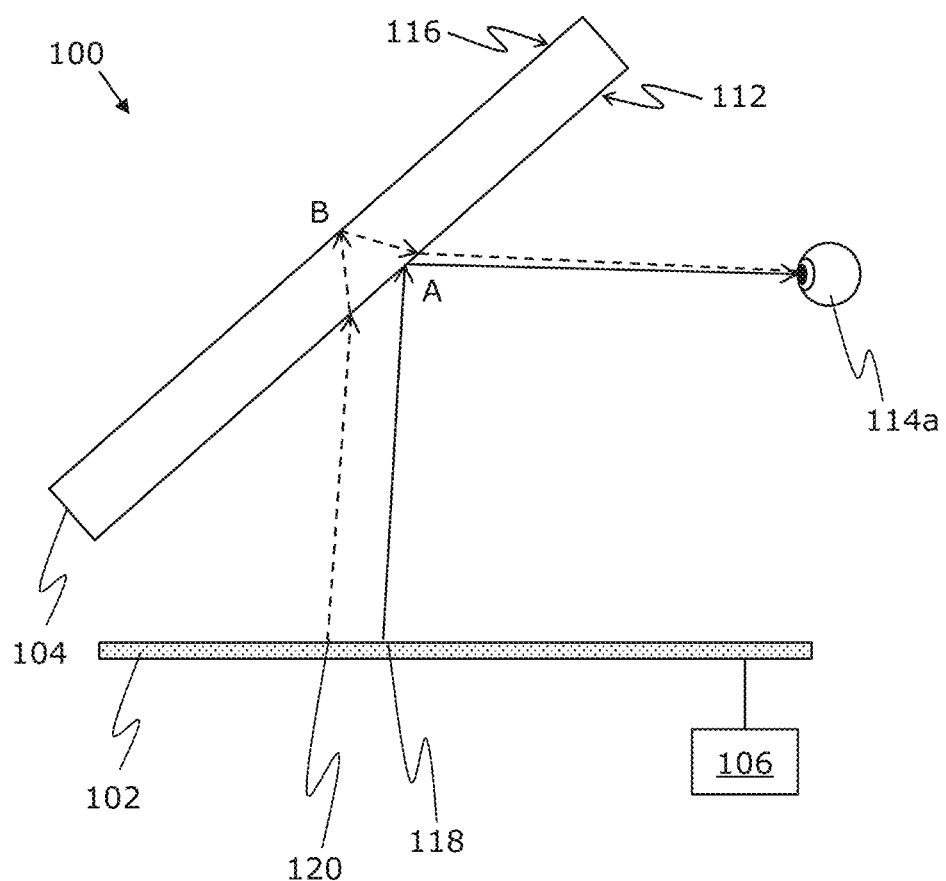
FIGS. 1A and 1B are schematic illustrations of a system for augmenting reality that incorporates secondary reflection compensation, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  a display unit;
  an optical combiner arranged on an optical path of the display unit and on an optical path of a real-world light field of a real-world environment; and
  at least one processor configured to:
    obtain an image to be displayed;
    obtain a relative location of eyes of at least one user with respect to a semi-reflective surface of the optical combiner;
    for a given region of the image, determine a corresponding portion of the semi-reflective surface of the optical combiner from which light rays of the given region of the image are to be reflected towards the eyes of the at least one user during display of the image, based on a relative position and orientation of the semi-reflective surface of the optical combiner with respect to an image plane of the display unit, a position of the given region in the image, and the relative location of the eyes of the at least one user with respect to the semi-reflective surface of the optical combiner;

for the corresponding portion of the semi-reflective surface of the optical combiner, determine a secondary reflection intensity of light rays of another region of the image that are to undergo secondary reflection from a corresponding portion of another surface of the optical combiner, the another surface being opposite to the semi-reflective surface;

increase a minimum intensity level of pixels in the image;

adjust intensity values of pixels in the given region of the image, based on the secondary reflection intensity determined for the corresponding portion of the semi-reflective surface of the optical combiner; and display the image via the display unit for producing a synthetic light field, wherein the optical combiner is employed to reflect the synthetic light field towards the eyes of the at least one user, whilst optically combining the synthetic light field with the real-world light field.

In a second aspect, an embodiment of the present disclosure provides a method comprising:

obtaining an image to be displayed;

obtaining a relative location of eyes of at least one user with respect to a semi-reflective surface of an optical combiner;

for a given region of the image, determining a corresponding portion of the semi-reflective surface of the optical combiner from which light rays of the given region of the image are to be reflected towards the eyes of the at least one user during display of the image via a display unit, based on a relative position and orientation of the semi-reflective surface of the optical combiner with respect to an image plane of the display unit, a position of the given region in the image, and the relative location of the eyes of the at least one user with respect to the semi-reflective surface of the optical combiner, wherein the optical combiner is arranged on an optical path of the display unit and on an optical path of a real-world light field of a real-world environment;

for the corresponding portion of the semi-reflective surface of the optical combiner, determining a secondary reflection intensity of light rays of another region of the image that are to undergo secondary reflection from a corresponding portion of another surface of the optical combiner, the another surface being opposite to the semi-reflective surface;

increasing a minimum intensity level of pixels in the image;

adjusting intensity values of pixels in the given region of the image, based on the secondary reflection intensity determined for the corresponding portion of the semi-reflective surface of the optical combiner; and displaying the image via the display unit for producing a synthetic light field, wherein the optical combiner is employed to reflect the synthetic light field towards the eyes of the at least one user, whilst optically combining the synthetic light field with the real-world light field.

The present disclosure provides the aforementioned system and the aforementioned method that offer several technical benefits over conventional techniques for mitigating ghosting artifacts in augmented reality displays. Unlike conventional techniques that rely on physical modifications to the optical combiner, for example, such as anti-reflective coatings or specialized windshield geometries, the system of the present disclosure provides a dynamic and adaptive solution. By leveraging the at least one processor to analyse optical interactions within the optical combiner, the system adjusts intensity values of pixels in real-time to compensate for secondary reflections. This ensures that the primary reflection is visually dominant, thereby effectively reducing ghosting artefacts and enhancing the clarity and contrast of the displayed images. Additionally, the system and the method are not limited to a predefined viewing position or a narrow "sweet spot," as they adapt the adjustment of the intensity values of the pixels based on the relative location of the eyes of the at least one user with respect to the optical combiner (which could be a default, pre-known location, or an actively-determined location). This allows for consistent performance across a wide range of viewing angles and positions. Furthermore, the solution provided by the system and the method is applicable to various optical combiner shapes and configurations (including both wedge-shaped optical combiners and non-wedge-shaped optical combiners), avoiding geometric constraints of any specific design for windshields. Moreover, the adaptive nature of the system also eliminates the dependency on 100% efficient anti-reflective coatings, offering a more robust and durable solution that maintains performance over time, even in the presence of wear and environmental factors. Together, these technical benefits provide an enhanced and versatile augmented reality experience, improving both usability and user comfort.

While the system and the method are well-suited for implementation in an HUD (whether a two-dimensional (2D) HUD or a three-dimensional (3D) HUD), it is important to note that their application is not limited to HUDs alone. They can also be adapted for use in other types of display systems. Examples of such display systems include, but are not limited to, augmented-reality (AR) glasses, mixed-reality (MR) headsets, wearable displays (for example, such as smart helmets), and automotive displays (for example, such as rear-view mirror displays).

For illustration purposes, there will now be described how the system and the method work to achieve the aforementioned technical benefits. For clarity purposes, the aforementioned steps have been recited with respect to the given region of the image. These steps can be performed similarly for other regions of the image as well. In other words, the step of determining the corresponding portion of the semi-reflective surface, the step of determining the secondary reflection intensity, and the step of adjusting the intensity values of the pixels can be performed for each individual one of a plurality of regions of the image. In operation, the aforementioned steps can be performed as follows:

1. The relative location of the eyes of the at least one user with respect to the optical combiner is obtained. In some implementations, the relative location of the eyes of the at least one user with respect to the optical combiner is determined based on a typical position of the eyes of the at least one user for the system. In this regard, a default, pre-known position may be considered as the typical position of the eyes of the at least one user. In other implementations, when the system is implemented as an HUD inside a vehicle, the relative location of the eyes of the at least one user with respect to the optical combiner can be determined, based on a current setting of at least one adjustable seat parameter of a seat of the vehicle on which the at least one user is sitting. In this regard, the at least one adjustable seat parameter could comprise at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat. It will be appreciated that the at least one adjustable seat parameter is approximately indicative of a current position of a head of the at least one user inside the vehicle, and thus, could be beneficially utilised for determining the relative location of the eyes of the at least one user with respect to the optical combiner. In yet other implementations, the system may further comprise tracking means, wherein the relative location of the eyes of the at least one user with respect to the optical combiner can be determined by utilising the tracking means. Such tracking means are well-known in the art.

2. The corresponding portion of the semi-reflective surface of the optical combiner from which the light rays of the given region of the image are to be reflected towards the eyes of the at least one user during display of the image is determined, based on the relative position and orientation of the semi-reflective surface of the optical combiner with respect to the image plane of the display unit, the position of the given region in the image, and the relative location of the eyes of the at least one user with respect to the optical combiner. In this regard, the relative position and orientation of the semi-reflective surface with respect to the image plane is pre-known. It will be appreciated that the relative position and orientation of the semi-reflective surface with respect to the image plane could change slightly, for example, due to temperature variations;

however, such a change can be determined using well-known techniques in the art. The step of determining the corresponding portion of the semi-reflective surface of the optical combiner can be performed using any suitable well-known technique.

3. The secondary reflection intensity of the light rays of the another region of the image that are to undergo secondary reflection from the corresponding portion of another surface of the optical combiner are then determined. Such a determination is performed based on a pre-known geometry of the optical combiner, to account for an optical path of the light rays upon refraction inside the optical combiner. This determination also takes into account the relative position and orientation of the semi-reflective surface of the optical combiner with respect to the image plane of the display unit, and the relative location of the eyes of the at least one user with respect to the optical combiner, as described later.

Throughout the present disclosure, the term "secondary reflection intensity" refers to the intensity of light rays that undergo secondary reflection. The secondary reflection intensity is notably lower compared to the intensity of the light rays undergoing primary reflection (i.e., the light rays reflected from the semi-reflective surface of the optical combiner towards the user's eyes). The secondary reflection intensity can optionally be determined based on one or more of the following factors:

(i) Refractive Index of Optical Combiner Material: By considering the refractive index and the known geometry of the optical combiner, refraction angles of the light rays within the combiner can be accurately calculated.

(ii) Reflectivity of Semi-Reflective Surface: The reflectivity of the semi-reflective surface determines a percentage "X" of the intensity of the light rays of the another region of the image that pass through the semi-reflective surface and reaches the another surface of the optical combiner.

(iii) Reflectivity of Opposite Surface: By accounting for the reflectivity of the another surface, the percentage "Y" of the light intensity that is reflected back from the another surface, which contributes to the secondary reflection, can be calculated.

These calculations collectively enable a precise determination of the secondary reflection intensity, aiding in adaptive adjustments to mitigate ghosting artifacts.

Additionally or alternatively, the secondary reflection intensity can optionally be measured from various angles and stored as pre-calibrated data. This enables the secondary reflection intensity to be determined as a "percentage" of the actual intensity of the light rays from another region of the image that contribute to the secondary reflection. This approach provides a practical and efficient means of accounting for the variation in the secondary reflection intensity across different viewing angles, further enhancing the accuracy of ghosting mitigation.

4. The minimum intensity level of the pixels in the image are increased. This step is commonly referred to as "black level lift" in the art. The minimum intensity level can be increased using conventional techniques. Alternatively, optionally, the minimum intensity level can be increased by taking into account an intensity of the real-world light field, as described below. This approach ensures better integration and visual harmony between the synthetic light field and the real-world light field.

5. The intensity values of the pixels in the given region of the image are then adjusted based on the secondary reflection intensity determined for the corresponding portion of the semi-reflective surface of the optical combiner. This adjustment ensures that the visual dominance of the primary reflection is maintained, effectively suppressing the impact of the secondary reflection for the given region of the image.

The intensity values of the pixels encompass intensity values of different colour components. As an example, the intensity values of the pixels can comprise separate intensity values for red, green and blue colours. Optionally, in this regard, the intensity values of the pixels in the given region of the image are adjusted separately for each sub-pixel (namely, for each colour component of the pixels). A technical benefit of adjusting the intensity values separately for each sub-pixel is that it allows for a granular control of the secondary reflection compensation, thereby improving a colour reproduction of the 3D visual scene. Optionally, in this regard, the secondary reflection intensity is determined at a sub-pixel level. In other words, the secondary reflection intensity that is to be taken into account (when adjusting the intensity values of the pixels) is also considered separately for each sub-pixel. As an example, if the secondary reflection intensity determined for the given region of the image indicates a relatively greener colour (that may be arising due to the another region of the image), the intensity values of the pixels in the given region of the image can be adjusted such that a relatively larger amount of secondary reflection intensity is subtracted from green sub-pixels as compared to other sub-pixels of said pixels in the given region of the image.

In this way, when the aforementioned steps are performed for each individual one of the plurality of regions of the image, the impact of the secondary reflection is suppressed for each individual one of these regions. As a result, the clarity and contrast of the displayed image are significantly improved, reducing ghosting artifacts and enhancing the overall visual experience for the user. This dynamic, adaptive approach provides a robust solution that works across varying environmental conditions and viewing angles.

There will now be described a specific implementation where the minimum intensity level can be increased by taking into account the intensity of the real-world light field. Optionally, in this regard, the system further comprises at least one real-world-facing camera, wherein the at least one processor is configured to:

capture at least one real-world image of the real-world environment via the at least one real-world-facing camera; and for the corresponding portion of the semi-reflective surface of the optical combiner, determine intensity values of pixels in a corresponding portion of the at least one real-world image, wherein the minimum intensity level of the pixels in the given region of the image is increased based on the intensity values of the pixels in the corresponding portion of the at least one real-world image.

In this regard, the corresponding portion of the at least one real-world image can be determined by:

reprojecting the at least one real-world image from a camera pose of the at least one real-world-facing camera (from which the at least one real-world image is captured) to a head pose of the at least one user or an eye pose of a given eye of the at least one user; and taking into account the relative position of the eyes of the at least one user with respect to the optical combiner, and the position of the corresponding portion of the semi-reflective surface in the optical combiner.

This allows to determine the intensity values of the pixels in the corresponding portion of the at least one real-world image, which is indicative of the intensity of the real-world light field passing towards the eyes of the at least one user through the corresponding portion of the semi-reflective surface. Prior to increasing the minimum intensity level, the intensity values of the pixels in the corresponding portion of the at least one real-world image may be optionally reduced taking into account an amount of attenuation caused by the optical combiner. The amount of attenuation depends on a specific transparency level of the optical combiner, which is pre-known.

A notable technical benefit of this implementation is its ability to adaptively adjust the minimum intensity level of the pixels in the given region of the image based on the brightness of the real-world light field, as captured by the real-world-facing camera. By dynamically increasing the minimum intensity level on a per-region basis, the system ensures optimal blending of the synthetic light field and the real-world light field, even in scenarios where the real-world light field is relatively bright. This adaptive adjustment minimizes ghosting artifacts, preserves image clarity and contrast, and facilitates the presentation of a visually seamless and high-quality 3D scene. Furthermore, it enhances depth resolution and ensures a more immersive viewing experience, reducing visual discomfort caused by mismatched brightness levels between virtual objects and real-world objects.

An additional technical benefit of this approach is its capability to dynamically account for the attenuation properties of the optical combiner. By adjusting the intensity values of the pixels in the corresponding portion of the at least one real-world image to reflect the attenuation properties of the optical combiner, the system ensures seamless blending of the synthetic light field and the real-world light field. This precise compensation is particularly advantageous in scenarios with high ambient light or complex lighting conditions.

Yet additionally, the use of reprojected real-world images from the camera's pose to the user's head pose (or eye pose) ensures that the adjustments are specific to the user's viewpoint. This enhances realism and immersion, improves visual quality and depth perception, and minimizes misalignment artifacts that could detract from the experience. Collectively, these enhancements result in a robust and user-centric system that delivers superior visual clarity, reduced ghosting, and enhanced comfort, even under challenging real-world lighting environments.

Pursuant to this specific implementation, the step of increasing the minimum intensity level of the pixels (hereinafter, interchangeably referred to as "black level lift", for the sake of convenience and clarity) is performed on a per-region basis. In other words, an amount by which the minimum intensity level of the pixels is increased (namely, the amount of the black level lift) can be different for different regions of the image, as it is determined based on the intensity values of the pixels in corresponding portions of the at least one real-world image. It will be appreciated that a size of each of these regions of the image is much larger than just a single pixel. This allows the at least one user to have a point of comparison for the darkest colour in the image, namely for what "black" is in the image. Consequently, this allows to compensate for the secondary reflection appropriately, such that ghosting artefacts are reduced and possibly minimised.

Optionally, the amount by which the minimum intensity level of the pixels is increased (namely, the amount of the black level lift) is varied across neighbouring regions of the image gradually. In other words, the amount of the black level lift is not varied drastically across the neighbouring regions. This facilitates a smooth transition in colours produced by the neighbouring regions of the image, thereby enhancing an overall image quality and visual perception. By "gradually" herein, it is meant that the amount of the black level lift is not changed by more than a predefined percent (of said amount) across the neighbouring regions. The predefined percent may, for example, lie in a range of 2 to 10 percent.

Moreover, in order to accurately compensate for the secondary reflection, it is essential to determine the secondary reflection intensity with precision. This requires accurately determining the another region of the image whose light rays are causing the secondary reflection that overlaps with the corresponding portion of the semi-reflective surface of the optical combiner. Optionally, in this regard, the at least one processor is configured to:

determine a viewing direction from a given eye of an individual one of the at least one user to the corresponding portion of the semi-reflective surface of the optical combiner, based on a relative location of the given eye with respect to the optical combiner, and a position of the corresponding portion of the semi-reflective surface in the optical combiner;

determine the corresponding portion of the another surface of the optical combiner, based on the viewing direction from the given eye to the corresponding portion of the semi-reflective surface of the optical combiner; and determine the another region of the image whose light rays are to undergo the secondary reflection from the corresponding portion of the another surface of the optical combiner towards the given eye, based on the relative position and orientation of the semi-reflective surface of the optical combiner with respect to the image plane of the display unit, a cross-sectional geometry of the optical combiner, and the relative location of the given eye with respect to the optical combiner.

A technical benefit of this is that it ensures precise compensation for secondary reflections by accurately identifying a specific region of the image whose light rays contribute to the secondary reflection. Determining the viewing direction from the user's eye to the corresponding portion of the semi-reflective surface and correlating it with the cross-sectional geometry and the orientation of the optical combiner allows for dynamically adjusting the display content. This precise mapping minimizes ghosting artifacts, improves image clarity and contrast, and enhances the overall visual experience. Additionally, this approach is adaptable to varying user positions and orientations, ensuring consistent performance across diverse viewing conditions.

The corresponding portion of the another surface of the optical combiner is a portion that overlaps with the corresponding portion of the semi-reflective surface along the viewing direction. In other words, when viewed by the given eye, the corresponding portion of the another surface lies behind the corresponding portion of the semi-reflective surface. The determination of the corresponding portion of the another surface can be performed based further on the cross-sectional geometry of the optical combiner.

The step of determining the another region of the image also depends on a position of the another region in the image, which determines a position on the image plane of display unit where the another region of the image would be displayed. It will be appreciated that the aforementioned steps can be performed using any suitable well-known techniques. As an example, the step of determining the another region of the image can be performed using an iterative search. In this regard, various heuristics can be used to speed up the search. For example, when searching the another region of the image (namely, the source of the secondary reflection), an initial guess for the another region of the image can be a region of the image that lies in a proximity of the given region of the image. This is because the secondary reflection is likely to reside relatively close to the primary reflection. Such heuristics allow the search to converge quickly.

For the sake of clarity, the aforementioned steps have been recited with respect to the given eye. It will be appreciated that this approach works well for both 2D display units as well as 3D display units (namely, light field display units). Notably, the aforementioned steps can be performed for each eye of each user, in a case where the at least one user is a plurality of users.

Furthermore, in case of 3D display units, the system can be further extended to compensate for crosstalk. In such a case, the image is a light field image, and the display unit is a light field display unit comprising a multiscopic optical element. The multiscopic optical element is employed to direct a first part and a second part of the synthetic light field towards a first eye and a second eye of an individual one of the at least one user, via the optical combiner, presenting a first image and a second image to the first eye and the second eye, respectively. Optionally, in this regard, the at least one processor is configured to:
  obtain the first image and the second image to be presented;
  for a given first region of the first image, determine an amount of crosstalk due to at least the second image;
  increase a minimum intensity level of pixels in the first image; and
  adjust first intensity values of pixels in the given first region of the first image, based on the amount of crosstalk determined for the given first region of the first image,
  wherein when obtaining the image, the at least one processor is configured to generate the light field image by utilising the first image and the second image.

The aforementioned steps have been recited with respect to the given first region, for the sake of clarity only. These steps can be performed similarly for other first regions of the first image as well. By "at least" in the phrase "an amount of crosstalk due to at least the second image", it is meant that the crosstalk could also arise from one or more pairs of first images and second images for one or more other users (namely, in a case where the at least one user comprises a plurality of users), in addition to the second image for the second eye of the individual one of the at least one user.

The crosstalk compensation can be performed using any conventional technique. A significant technical benefit of performing crosstalk compensation is the ability to present a high-quality, high-contrast 3D visual scene that is free from ghosting artifacts and offers superior depth resolution. This improves overall image quality and enhances the user's viewing experience, while preventing visual discomfort and ensuring immersive and comfortable interaction with the 3D display.

Alternatively, optionally, the minimum intensity level of the pixels in the given first region of the first image is increased based on intensity values of pixels in a corresponding first portion of the at least one real-world image. Optionally, in this regard, the at least one processor is configured to:
  for the given first region of the first image, determine a corresponding first portion of the semi-reflective surface of the optical combiner from which light rays of the given first region of the first image are to be reflected towards the first eye of the individual one of the at least one user during display of the image, based on the relative position and orientation of the semi-reflective surface of the optical combiner with respect to the image plane of the display unit, and a position of the given first region in the first image; and
  for the corresponding first portion of the semi-reflective surface of the optical combiner, determine the intensity values of the pixels in the corresponding first portion of the at least one real-world image.

In this regard, the corresponding first portion of the at least one real-world image can be determined by reprojecting the at least one real-world image from the camera pose of the at least one real-world-facing camera to the head pose of the individual one of the at least one user or an eye pose of the first eye. This allows to determine the intensity values of the pixels in the corresponding first portion of the at least one real-world image, which is indicative of the intensity of the real-world light field passing towards the first eye through the corresponding first portion of the semi-reflective surface. It will be appreciated that prior to increasing the minimum intensity level, the intensity values of the pixels in the corresponding first portion of the at least one real-world image may be beneficially reduced taking into account an amount of attenuation caused by the optical combiner.

A notable technical benefit of such adaptive crosstalk compensation is that it ensures seamless integration and visual harmony between the synthetic light field and the real-world light field. This adaptive approach enables the presentation of a high-quality, high-contrast 3D visual scene that remains free from ghosting artifacts and retains high depth resolution, even in bright real-world light conditions. This not only enhances image quality but also elevates the overall user experience while preventing visual discomfort.

An additional technical benefit is the system's ability to dynamically account for the attenuation properties of the optical combiner. By adjusting intensity values to reflect the optical combiner's attenuation properties, the system ensures that the synthetic light field blends seamlessly with the real-world light field. This precise control over brightness is particularly advantageous in environments with high ambient light or complex lighting conditions.

Yet additionally, by reprojecting real-world images from the camera's pose to the user's head pose (or the eye pose), the system ensures that adjustments are specific to the user's viewpoint. This viewpoint-specific adaptation enhances realism and immersion in the displayed 3D scene, improves visual quality and depth perception, and minimizes potential misalignment artifacts. Collectively, these enhancements result in a robust, user-centric system that delivers superior visual clarity, reduced ghosting, and enhanced comfort, even in challenging real-world lighting environments.

Moreover, the crosstalk compensation can be performed in a similar manner for the second image as well. Optionally, in this regard, the at least one processor is configured to:

for a given second region of the second image, determine an amount of crosstalk due to at least the first image;

increase a minimum intensity level of pixels in the second image; and adjust second intensity values of pixels in the given second region of the second image, based on the amount of crosstalk determined for the given second region of the second image.

The aforementioned steps have been recited with respect to the given second region, for the sake of clarity only. These steps can be performed similarly for other second regions of the second image as well. By "at least" in the phrase "an amount of crosstalk due to at least the first image", it is meant that the crosstalk could also arise from the one or more pairs of the first images and the second images for the one or more other users (namely, in a case where the at least one user comprises a plurality of users), in addition to the first image for the first eye of the individual one of the at least one user.

This crosstalk compensation can be performed using any conventional technique. Alternatively, optionally, the minimum intensity level of the pixels in the given second region of the second image is increased based on intensity values of pixels in a corresponding second portion of the at least one real-world image. Optionally, in this regard, the at least one processor is configured to:

for the given second region of the second image, determine a corresponding second portion of the semi-reflective surface of the optical combiner from which light rays of the given second region of the second image are to be reflected towards the second eye of the individual one of the at least one user during display of the image, based on the relative position and orientation of the semi-reflective surface of the optical combiner with respect to the image plane of the display unit, and a position of the given second region in the second image; and for the corresponding second portion of the semi-reflective surface of the optical combiner, determine the intensity values of the pixels in the corresponding second portion of the at least one real-world image.

In this regard, the corresponding second portion of the at least one real-world image can be determined by reprojecting the at least one real-world image from the camera pose of the at least one real-world-facing camera to the head pose of the individual one of the at least one user or an eye pose of the second eye. This allows to determine the intensity values of the pixels in the corresponding second portion of the at least one real-world image, which is indicative of the intensity of the real-world light field passing towards the second eye through the corresponding second portion of the semi-reflective surface. It will be appreciated that prior to increasing the minimum intensity level, the intensity values of the pixels in the corresponding second portion of the at least one real-world image may be beneficially reduced taking into account an amount of attenuation caused by the optical combiner.

Furthermore, the system can be beneficially further extended to compensate for the secondary reflection of the crosstalk. Optionally, in this regard, the at least one processor is configured to:

for the given second region of the second image, determine the corresponding second portion of the semi-reflective surface of the optical combiner from which light rays of the given second region of the second image are to be reflected towards the second eye of the individual one of the at least one user during display of the image, based on the relative position and orientation of the semi-reflective surface of the optical combiner with respect to the image plane of the display unit, and the position of the given second region in the second image;

for the corresponding second portion of the semi-reflective surface of the optical combiner from which the light rays of the given second region of the second image are to be reflected towards the second eye of the individual one of the at least one user, determine another secondary reflection intensity of light rays of the crosstalk, due to at least the first image, that are to undergo secondary reflection from a corresponding second portion of the another surface of the optical combiner; and adjust the second intensity values of the pixels in the given second region of the second image, based further on the another secondary reflection intensity determined for the corresponding second portion of the semi-reflective surface of the optical combiner.

Likewise, optionally, the at least one processor is configured to:

for the given first region of the first image, determine the corresponding first portion of the semi-reflective surface of the optical combiner from which light rays of the given first region of the first image are to be reflected towards the first eye of the individual one of the at least one user during display of the image, based on the relative position and orientation of the semi-reflective surface of the optical combiner with respect to the image plane of the display unit, and the position of the given first region in the first image;

for the corresponding first portion of the semi-reflective surface of the optical combiner from which the light rays of the given first region of the first image are to be reflected towards the first eye of the individual one of the at least one user, determine yet another secondary reflection intensity of light rays of the crosstalk, due to at least the second image, that are to undergo secondary reflection from a corresponding first portion of the another surface of the optical combiner; and adjust the first intensity values of the pixels in the given first region of the first image, based further on the yet another secondary reflection intensity determined for the corresponding first portion of the semi-reflective surface of the optical combiner.

Compensating for the secondary reflection of the crosstalk has several benefits. First, by determining the secondary reflection intensity of the crosstalk, the system accounts for multiple layers of optical interference. This ensures that intensity adjustments are not only based on primary reflections but also on secondary interactions, resulting in a more accurate compensation for visual distortions. Second, the adjustment of intensity values of the pixels, incorporating the effects of secondary reflections, minimizes the residual impact of crosstalk on the visual output. This improves the clarity and contrast of the 3D visual scene, enhancing its overall quality. Third, the system dynamically adapts to real-time changes in the viewing conditions, such as variations in user position, or the virtual objects being presented. This ensures consistent performance across different scenarios, maintaining a high-quality visual experience. Fourth, by considering both the primary reflections and the secondary reflections from the optical combiner surfaces, the system integrates complex optical phenomena into its calculations. This leads to a comprehensive adjustment mechanism that eliminates ghosting artifacts and improves the depth resolution of the 3D scene. Fifth, the calculations are tailored to the individual user's viewing position and eye orientation, ensuring that the intensity adjustments are specific to the user's perspective. This enhances immersion and realism, providing a more personalized and comfortable viewing experience. Sixth, by addressing the impact of secondary reflections on crosstalk, the system remains robust even in challenging environments with high ambient light or complex real-world lighting. This adaptability ensures exceptionally high-quality visuals regardless of external conditions. Seventh, the accurate adjustments based on the secondary reflection intensity help reduce artifacts and inconsistencies in the displayed scene, preventing eye strain and visual discomfort for the user. This makes the system suitable for prolonged use in augmented-reality applications. These technical benefits collectively contribute to a superior and user-centric 3D display system that excels in clarity, realism, and user comfort.

Moreover, in a specific implementation where the step of increasing the minimum intensity level of the pixels is performed on a per-region basis during crosstalk compensation, following considerations can be made:

1. Optionally, the amount by which the minimum intensity level of the pixels is increased (namely, the amount of the black level lift) can be determined further based on whether an amount of crosstalk determined for a given region of a given image is smaller than a predefined threshold amount. In other words, if the amount of crosstalk for the given region is almost negligible, the steps of increasing the minimum intensity level (namely, the black level lift) and adjusting the intensity values of the pixels in the given region may be skipped completely or attenuated. In this regard, the predefined threshold amount depends on a dynamic range of colours in the given image. As an example, for an 8 bit-representation (which allows for intensity values ranging from 0 to 255 units), the predefined threshold amount may lie in a range of 1 to 10 units. Herein, the term "given image" encompasses both the first image and the second image.

2. Optionally, the amount by which the minimum intensity level of the pixels is increased (namely, the amount of the black level lift) can be determined further based on whether the intensity values of the pixels in the given region of the given image is higher than an amount of crosstalk determined for the given region of the given image. Thus, there may be at least one region of the given image for which the step of increasing the minimum intensity level of the pixels can be skipped completely, or the minimum intensity level of the pixels can be increased by a smaller amount. Optionally, in this regard, the at least one processor is configured to determine, for the given region of the given image, whether or not the step of increasing the minimum intensity level of the pixels of the given region (namely, the black level lift) is to be performed, based on whether the intensity values of the pixels in the given region of the given image is higher than the amount of crosstalk determined for the given region of the given image. In this regard, if the intensity values are not higher than the amount of crosstalk, then the step of increasing the minimum intensity level of the pixels of the given region can be performed. Otherwise, if the intensity values are higher than the amount of crosstalk (for example, by a predefined margin), then the step of increasing the minimum intensity level of the pixels of the given region can be skipped or attenuated.

Furthermore, in implementations where the step of increasing the minimum intensity level of the pixels is performed on a per-region basis during secondary reflection compensation, following considerations can be made. Optionally, in such implementations, when increasing the minimum intensity level of the pixels in the given region of the image, the black level lift is performed at a sub-pixel level. In this regard, the intensity values of the pixels in the corresponding portion of the at least one real-world image are considered at a sub-pixel level. As an example, if the intensity values of the pixels in the corresponding portion of the at least one real-world image pertain to a relatively greener colour, the black level lift can be performed in such a manner that a minimum intensity level of a green sub-pixel is increased by a relatively smaller amount as compared to the other sub-pixels of said pixels in the given region of the image. This is because the real-world light field adds to the synthetic light field of these pixels, and therefore, a relatively smaller amount of increase would be beneficial to show a near-original colour of said pixels.

Moreover, optionally, in such implementations, when increasing the minimum intensity level of the pixels in the given region of the image, the at least one processor is configured to:
  detect when the given region of the image presents at least a part of at least one virtual object, and when the intensity values of the pixels in the corresponding portion of the at least one real-world image exceed respective sums of the intensity values of the pixels in the given region of the image and a multiple of an amount by which the minimum intensity level is to be increased; and
  when it is detected that the given region of the image presents at least a part of at least one virtual object, and the intensity values of the pixels in the corresponding portion of the at least one real-world image exceed the respective sums of the intensity values of the pixels in the given region of the image and the multiple of said amount, perform any one of:
    selectively skip increasing the minimum intensity level of those pixels in the given region of the image that present at least the part of the at least one virtual object;
    increase the minimum intensity level of those pixels in the given region of the image that present at least the part of the at least one virtual object by a given amount that is smaller than another amount by which the minimum intensity level of remaining pixels in the given region of the image is increased.

A technical benefit of this is that it allows for presenting even relatively dark virtual content on a highly-bright real-world background. This is made possible because the step of increasing the minimum intensity level of the pixels (namely, the black level lift) can be performed selectively. In essence, those pixels for which the step of increasing the minimum intensity level is skipped selectively (namely, the black level lift is not performed at all), or for which the minimum intensity level is increased by the given amount that is relatively smaller than the another amount (namely, the black level lift is attenuated and performed to a relatively smaller extent), would appear darker than the remaining pixels in the given region. In this regard, these pixels can be selected based on a shape and a size of at least the part of the at least one virtual object they present. These pixels may also be selected based on whether the at least one user is gazing at the part of the at least one virtual object. Such a selective manner of performing the step of increasing the minimum intensity level is particularly beneficial for a case where the part of the at least one virtual object is of interest to the at least one user.

Otherwise, when it is detected that the intensity values of the pixels in the corresponding portion of the at least one real-world image do not exceed the respective sums of the intensity values of the pixels in the given region of the image and the multiple of said amount, the minimum intensity level of the pixels in the given region of the image may be increased uniformly in the given region of the image.

In some cases, the multiple of the amount by which the minimum intensity level is to be increased may be a positive integer multiple of said amount (for example, such as 1 times, 2 times, 3 times, or 5 times of said amount). In other cases, said multiple may be a positive non-integer multiple of said amount (for example, such as 1.8 times, 2.5 times, 3.75 times, or 4.8 times of said amount).

For illustration purposes only, there will now be considered an example where the intensity values of the image are expressed using an 8-bit representation, which allows for intensity values ranging between 0 and 255 units. In this example, there will now be considered the following:
(a) said amount (by which the minimum intensity level is to be increased) is equal to 20 units;
(b) the multiple of said amount is 5 times of said amount, that is, equal to 100 units;
(c) the intensity values of the pixels in the corresponding portion of the at least one real-world image is 150 units;
(d) the intensity values of the pixels in the given region of the image lies in a range of 30 to 40 units.

In such a case, the respective sums of the intensity values of the pixels in the given region of the image and the multiple of said amount would lie in a range of 130 to 140 units. Thus, the intensity values of the pixels in the corresponding portion of the at least one real-world image (which is 150 units) exceed the respective sums (which lie in the range of 130 to 140 units).

Now, if the black level lift is performed by said amount of 20 units and the secondary reflection compensation reduces the intensity values by 20 units, those pixels whose original intensity values were 30 units would appear brighter as 180 units after the secondary reflection compensation, due to the black level lift and the intensity of the real-world light field. Mathematically, this can be represented as follows:

$$O=I+B-C+R=30+20-20+150=180 \text{ units},$$

Wherein
"O" represents a final output intensity value of a given pixel, namely as it would appear to a user;
"I" represents an original intensity value of the given pixel;
"B" represents the amount by which the minimum intensity level is increased;
"C" represents secondary reflection compensation for the given pixel; and
"R" represents the intensity of the real-world light field corresponding to the given pixel.

However, if the black level lift is skipped completely for said pixels (that is, the step of increasing the minimum intensity level of these pixels is selectively skipped), these pixels would appear relatively less bright at 160 units (as compared to 180 units). As a result, these pixels would appear as being 20 units extra darker than the remaining pixels. This may be particularly beneficial when the at least one virtual object is to be presented as virtual text on a real-world object, for example, such as a bright real-world wall.

Moreover, optionally, in such implementations, the at least one processor is configured to:
detect, for the given region of the image, when the intensity values of the pixels in the corresponding portion of the at least one real-world image exceed at least one of: (a) a predefined threshold intensity value, (b) respective ones of the intensity values of the pixels in the given region of the image, (c) respective sums of the intensity values and a multiple of an amount by which the minimum intensity level is to be increased; and
when it is detected, for the given region of the image, that the intensity values of the pixels in the corresponding portion of the at least one real-world image exceed at least one of: (a) the predefined threshold intensity value, (b) the respective ones of the intensity values of the pixels in the given region of the image, (c) the respective sums of the intensity values and the multiple of said amount, perform at least one of:
skip determining the secondary reflection intensity;
skip increasing the minimum intensity level of the pixels in the given region of the image;
reduce an amount by which the minimum intensity level is increased in at least one of: the given region of the image, a surrounding region of the given region in the image;
skip adjusting the intensity values of the pixels in the given region of the image, based on the secondary reflection intensity determined;
reduce the intensity values of the pixels in the given region of the image.

Regarding the aforementioned first criterion (namely, pertaining to the aforesaid (a)), the predefined threshold intensity value may depend on the dynamic range of colours in the image. As an example, for an 8 bit-representation (which allows for intensity values ranging from 0 to 255 units), the predefined threshold intensity value may lie in a range of 127 to 255 units. In such an example, the intensity values of the pixels in the corresponding portion of the at least one real-world image correspond to relatively brighter intensities, which may likely obscure the given region of the image.

Regarding the aforementioned second criterion (namely, pertaining to the aforesaid (b)), it may be sufficient for the intensity values of the pixels in the corresponding portion of the at least one real-world image to exceed the respective ones of the intensity values of the pixels in the given region of the image. In such a case, when the second criterion is satisfied, it means that the real-world light field is brighter than the given region of the image, and may likely obscure the given region of the image.

Regarding the aforementioned third criterion (namely, pertaining to the aforesaid (c)), the respective sums of the intensity values and the multiple of the amount by which the minimum intensity level is to be increased can be implemented as explained earlier. As an example, the multiple of said amount may be taken as two times of said amount. Employing a multiple of said amount that is higher than said amount ensures that when the third criterion is satisfied, it means that the real-world light field is much brighter than the given region of the image, and is very likely to obscure the given region of the image.

Accordingly, when at least one of the aforesaid criteria (namely, pertaining to (a), (b), (c)) is satisfied, it may be beneficial to skip the secondary reflection compensation to save computational resources, as the brightness of the real-world field would hide any secondary reflections. Optionally, in such a case, at least one of: the step of determining the secondary reflection intensity for the given region of the image, the step of increasing the minimum intensity level of the pixels in the given region of the image, the step of adjusting the intensity values of the pixels in the given region of the image, may be skipped completely.

Alternatively, optionally, instead of skipping the secondary reflection compensation completely, it may be beneficial to attenuate the secondary reflection compensation. Accordingly, in this regard, the amount by which the minimum intensity level is increased can be reduced in the at least one of: the given region of the image, the surrounding region of the given region in the image. This results in an improved contrast, as explained earlier.

Moreover, if the real-world light field is detected to be relatively bright, it may not be necessary to display the given region of the image at full brightness (namely, its original intensity value), as it would be hidden by the real-world brightness. Optionally, in this regard, the intensity values of the pixels in the given region of the image are reduced. This allows to reduce power consumption of the display unit. Notably, such reduction of the intensity values is different from adjusting of the intensity values for the secondary reflection compensation.

Otherwise, when it is detected, for the given region of the image, that the intensity values of the pixels in the corresponding portion of the at least one real-world image do not exceed any one of: (a) the predefined threshold intensity value, (b) the respective ones of the intensity values, (c) the respective sums, the secondary reflection compensation can be performed as explained earlier. In such a case, the secondary reflection compensation may not be required to be skipped or attenuated.

Furthermore, optionally, the system further comprises tracking means, wherein the at least one processor is configured to:
  determine gaze directions of the eyes of the at least one user, by utilising the tracking means;
  determine a focus depth at which the at least one user is gazing, based on the gaze directions of the eyes;
  detect when a difference between the focus depth and an optical depth at which at least one virtual object is being presented via the synthetic light field is greater than a predefined threshold difference; and
  when it is detected that said difference is greater than the predefined threshold difference, perform at least one of:
    skip determining the secondary reflection intensity;
    skip or attenuate increasing the minimum intensity level of the pixels in the image;
    skip or attenuate adjusting the intensity values of the pixels in the given region of the image, based on the secondary reflection intensity determined.

The tracking means can be implemented as gaze-tracking means that are well-known in the art. The focus depth at which the at least one user is gazing can be determined based on an interpupillary distance between the eyes of the at least one user (namely, the first eye and the second eye of the individual one of the at least one user) and a convergence of the gaze directions, using any suitable well-known technique.

The optical depth at which the at least one virtual object is being presented is known, because it correlates with a disparity between the first image and the second image presented to the first eye and the second eye of the at least one user. This optical depth is determined along at least one of the gaze directions. Moreover, in case of multiple virtual objects, the at least one virtual object comprises a virtual object (or its part) that lies in a gaze region of a field of view of the at least one user. In this regard, the gaze region is determined based on the gaze directions of the at least one user.

When the difference between the focus depth and said optical depth is detected to be greater than the predefined threshold difference, it means that the at least one user is not gazing at the at least one virtual object being presented to the at least one user via the synthetic light field. In this regard, the predefine threshold difference can be expressed in terms of a predefined percent of any one of: the focus depth, the optical depth at which the at least one virtual object is being presented. As an example, the predefined percent could lie in a range of 10 percent to 20 percent. Moreover, the predefined threshold difference can be selected depending on a depth of field at the focus depth. Similar to the depth of field (namely, related to focus steps) in a camera, the human eye also focuses sharply in a given depth of field at a given focus depth. As an example, for near-focus, the predefined threshold difference may lie in a range of 10 cm to 30 cm. As another example, for far-focus, the predefined threshold difference may lie in a range of 0.5 metre to 2 metres.

Thus, when it is detected that the at least one user is not gazing at the at least one virtual object, it may be beneficial to skip or attenuate the secondary reflection compensation. Optionally, at least one of: the step of determining the secondary reflection intensity, the step of increasing the minimum intensity level, the step of adjusting the intensity values of the pixels, may be skipped completely. This allows for saving computational resources.

Alternatively, optionally, instead of skipping the secondary reflection compensation completely, it may be beneficial to attenuate the secondary reflection compensation. Accordingly, in this regard, at least one of: the step of increasing the minimum intensity level of the pixels, the step of adjusting the intensity values of the pixels, may be attenuated. When the step of increasing the minimum intensity level of the pixels is attenuated, it means that the amount by which the minimum intensity level is increased can be reduced in the at least one of: the given region of the image, the surrounding region of the given region in the image. This results in an improved contrast, as explained earlier. When the step of adjusting the intensity values of the pixels is attenuated, it means that an amount by which the intensity values of the pixels are to be adjusted can be reduced.

Otherwise, when it is detected that said difference is not greater than the predefined threshold difference, the secondary reflection compensation can be performed as explained earlier. In such a case, the secondary reflection compensation may not be required to be skipped or attenuated.

Moreover, optionally, the system further comprising the tracking means, wherein the at least one processor is configured to:
- determine gaze directions of the eyes of the at least one user, by utilising the tracking means;
- detect, based on the gaze directions of the eyes, when the at least one user is not gazing through the corresponding portion of the semi-reflective surface of the optical combiner; and
- when it is detected that the at least one user is not gazing through the corresponding portion of the semi-reflective surface of the optical combiner, perform at least one of:
  - skip determining the secondary reflection intensity;
  - skip or attenuate increasing the minimum intensity level of the pixels in the image;
  - skip or attenuate adjusting the intensity values of the pixels in the given region of the image, based on the secondary reflection intensity determined.

In this regard, when it is determined that the gaze direction of the given eye is not intersecting with the corresponding portion of the semi-reflective surface of the optical combiner, it is detected that the at least one user is not gazing at the given region of the image. As a result, this given region of the image is considered as a non-focus region of the at least one user, where it may not be necessary to perform the secondary reflection compensation.

Thus, when it is detected that the at least one user is not gazing at the given region of the image, it may be beneficial to skip or attenuate the secondary reflection compensation. Optionally, at least one of: the step of determining the secondary reflection intensity, the step of increasing the minimum intensity level, the step of adjusting the intensity values of the pixels, may be skipped completely. This allows for saving computational resources.

Alternatively, optionally, instead of skipping the secondary reflection compensation completely, it may be beneficial to attenuate the secondary reflection compensation. Accordingly, in this regard, at least one of: the step of increasing the minimum intensity level of the pixels, the step of adjusting the intensity values of the pixels, may be attenuated. This results in an improved contrast, as explained earlier.

Otherwise, when it is detected that the at least one user is gazing at the given region of the image, the secondary reflection compensation can be performed as explained earlier. In such a case, the secondary reflection compensation may not be required to be skipped or attenuated.

Furthermore, optionally, the system further comprises the tracking means and at least one real-world-facing depth camera, wherein the at least one processor is configured to:
- determine gaze directions of the eyes of the at least one user, by utilising the tracking means;
- determine a focus depth at which the at least one user is gazing, based on the gaze directions of the eyes;
- generate a depth map of the real-world environment, by utilising the at least one real-world-facing depth camera;
- determine an optical depth at which a real-world object is present, based on the depth map and the gaze directions of the eyes;
- detect when a first difference between the focus depth and an optical depth at which at least one virtual object is being presented via the synthetic light field is smaller than a first predefined threshold difference, and when a second difference between the focus depth and the optical depth at which the real-world object is present is greater than a second predefined threshold difference; and
- when it is detected that the first difference is smaller than the first predefined threshold difference and the second difference is greater than the second predefined threshold difference, apply a defocus blur on the at least one real-world image of the real-world environment, prior to determining the intensity values of the pixels in the corresponding portion of the at least one real-world image.

The optical depth at which the real-world object is present is determined along at least one of the gaze directions. This optical depth can be determined based on an intersection of the at least one of the gaze directions with the depth image. In this regard, the depth image is reprojected from a perspective of the at least one real-world-facing depth camera to a perspective of at least one of the eyes of the at least one user (to which the at least one of the gaze directions pertains). Examples of the at least one real-world-facing depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. Moreover, in case of multiple virtual objects, the at least one virtual object comprises a virtual object (or its part) that lies in the gaze region of the field of view of the at least one user.

When the first difference between the focus depth and the optical depth at which the at least one virtual object is being presented is smaller than the first predefined threshold difference, it means that the at least one user is gazing at the at least one virtual object. When the second difference between the focus depth and the optical depth at which the real-world object is present is greater than the second predefined threshold difference, it means that the at least one user is not gazing at the real-world object. Optionally, the second predefined threshold difference is selected as a higher value as compared to the first predefined threshold difference. This takes care of a scenario where the at least one virtual object is displayed at a significantly different optical depth (vergence-wise) as compared to the real-world object. As an example, the first predefined threshold difference may lie in a range of 0.25 metre to 2 metres, while the second predefined threshold difference may lie in a range of 2 metres to 10 metres.

A technical benefit of applying the defocus blur on the at least one real-world image of the real-world environment upon such a detection is that it allows for compensating for a difference in the optical depth between the at least one virtual object and the real-world object, thereby allowing for optimising the secondary reflection compensation for cases where the at least one user is gazing at the optical depth of the at least one virtual object. This is because in such a case, the real-world object is out-of-focus for the at least one user.

Otherwise, when it is detected that the first difference is not smaller than the first predefined threshold difference, and/or the second difference is not greater than the second predefined threshold difference, the defocus blur may not be applied on the at least one real-world image of the real-world environment.

Notably, when combining the synthetic light field with the real-world light field using the optical combiner, if the at least one virtual object is presented at an optical depth (namely, a vergence distance) that is closer to the optical depth at which the real-world object is present, both eyes see the at least one virtual object overlaid with the same real-world object (or the same part thereof). As an example, a virtual advertisement (namely, the at least one virtual object) may be presented to look like as if it was painted on an outer wall of a building (namely, the real-world object). However, if the at least one virtual content is much closer to the at least one user than the real-world object, the at least one user would see different regions of the real-world object (or even different real-world objects) overlaid with the at least one virtual object due to binocular parallax. Both these situations can be leveraged in secondary reflection compensation, as described above.

Furthermore, in case of 3D display units where the optical depth at which the at least one virtual object is being presented is similar to a native optical depth of the light field display unit, the defocus blur may be applied without a need to check for any criteria. This is because the real-world object is typically at a relatively larger optical depth, as compared to the native optical depth. Herein, the native optical depth of the light field display unit is equal to a sum of a distance between a given eye of a given user and the optical combiner and a distance between the optical combiner and a light-emitting component of the light field display unit. By "similar" hereinabove, it is meant that said optical depth is within, for example, 10 centimetre of the native optical depth. In a typical implementation inside a vehicle, the native optical depth may lie in a range of 100 cm to 300 cm.

The aforesaid defocus blurring of the at least one real-world image can be applied using any suitable well-known technique. Such defocus blurring can be referred to as a simulated defocus blur, and involves smoothing out details in a given image. Such blurring can be achieved by using various convolution techniques, for example, such as a box blur, a Gaussian blur, a median blur, or similar. The box blur involves a simple averaging of the intensity values of pixels within a given kernel size. The Gaussian blur involves use of a kernel that is based on a Gaussian function to provide a weighted average, wherein pixels located at a central part of a given kernel size have a higher weightage. The median blur involves replacing an intensity value of a given pixel with a median value of its neighbouring pixels within a given kernel size. All these techniques are well-known in the art.

For illustration purposes only, there will now be described how various components of the system can be implemented. The at least one processor controls an overall operation of the system. The at least one processor is communicably coupled to the display unit and optionally, to one or more of: the at least one real-world-facing camera, the tracking means, the at least one real-world-facing depth camera. Optionally, the at least one processor is implemented as a processor of the display unit. Alternatively, optionally, the at least one processor is implemented as a processor of a computing device that is communicably coupled to the display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracking means" refers to a specialised equipment for detecting and/or tracking a location of eyes of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a ToF camera, a LIDAR camera, an RGB-D camera, a laser rangefinder, a stereo camera, a plenoptic camera, a ranging camera, a SONAR camera. It will be appreciated that any combination of various different types of cameras (namely, the at least one visible-light camera, the at least one IR camera, the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images. It will be appreciated that the tracking means tracks both eyes of the at least one user with a significantly high accuracy and precision, such that an error in determining the relative location may, for example, be minimised to within a tolerance range of approximately (+/−) 8 millimetres.

In some implementations, the display unit can be implemented as a light field display unit. Pursuant to embodiments of the present disclosure, different types of light field display units can be implemented. For example, the light field display unit can be any one of: a hogel-based light field display unit, a lenticular array based light field display unit, a parallax-barrier based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. Depending on the type of the light field display unit, the multiscopic optical element can be a lenticular array, a parallax barrier, or similar. Optionally, the at least one processor is configured to control the multiscopic optical element, based on the relative location of the first eye and of the second eye of the individual one of the at least one user with respect to the optical combiner, to direct light produced by a first set of pixels of the light field image towards the first eye, whilst directing light produced by a second set of pixels of the light field image towards the second eye.

The image can be obtained based on the relative location of the eyes of the at least one user. As mentioned earlier, in case of a 3D display unit (namely, the light field display unit), the light field image is generated by utilising the first image and the second image, which are obtained based on the relative location of the first eye and of the second eye of the individual one of the at least one user with respect to the optical combiner. In a case where the at least one user comprises a plurality of users, there would be a corresponding pair of a first image and a second image for each of the plurality of users. The light field image may be understood to be a two-dimensional (2D) image comprising a plurality of pixels, wherein the first set of pixels from amongst the plurality of pixels is responsible for generating the first part of the synthetic light field that corresponds to the first eye, and the second set of pixels from amongst the plurality of pixels is responsible for generating the second part of the synthetic light field that corresponds to the second eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because the same light field image comprises visual information corresponding to the first eye as well as the second eye of the individual one of the at least one user.

In some implementations, the at least one virtual object is a part of a virtual environment. Optionally, in such implementations, the at least one processor is configured to generate the first image and the second image from a perspective of the relative location of the first eye and the second eye of the at least one user with respect to the optical combiner, by employing a 3D model of the virtual environment. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to generate the first image and the second image to be presented to the first eye and the second eye of the at least one user in a form of 2D user interface (UI) elements. The 2D UI elements could pertain to, for example, a virtual navigation tool, a virtual gadget, a virtual message, a virtual entity, a virtual entertainment media, a virtual information, or similar.

Throughout the present disclosure, the term "optical combiner" refers to a specialised equipment that is capable of reflecting a corresponding part of the synthetic light field towards a given eye of the at least one user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to the image plane of the display unit lies in a range of 10 degrees and 75 degrees.

Moreover, the at least one real-world-facing camera is arranged to face the real-world environment. As an example, in a case where the system is implemented in a vehicle, the at least one real-world-facing camera can be mounted on an exterior body of the vehicle, such that the optical combiner does not lie in an optical path of the at least one real-world-facing camera. The at least one real-world-facing camera comprises at least one visible-light camera and optionally, at least one depth camera. Examples of the at least one visible-light camera include, but are not limited to, an RGB camera, an RGB-A camera, an RGB-D camera, an RGBW camera, an RYYB camera, an RGGB camera, an RCCB camera, an RGB-IR camera, and a monochrome camera. Examples of the at least one depth camera include, but are not limited to, a ToF camera, a LIDAR camera, an RGB-D camera, a laser rangefinder, a stereo camera, a plenoptic camera, a ranging camera, a SONAR camera.

The present disclosure also relates to the method as described above. Various embodiments and variants disclosed above, with respect to the aforementioned first aspect, apply mutatis mutandis to the method.

Optionally, the method further comprises:
  determining a viewing direction from a given eye of an individual one of the at least one user to the corresponding portion of the semi-reflective surface of the optical combiner, based on a relative location of the given eye with respect to the optical combiner, and a position of the corresponding portion of the semi-reflective surface in the optical combiner;
  determining the corresponding portion of the another surface of the optical combiner, based on the viewing direction from the given eye to the corresponding portion of the semi-reflective surface of the optical combiner; and
  determining the another region of the image whose light rays are to undergo the secondary reflection from the corresponding portion of the another surface of the optical combiner towards the given eye, based on the relative position and orientation of the semi-reflective surface of the optical combiner with respect to the image plane of the display unit, a cross-sectional geometry of the optical combiner, and the relative location of the given eye with respect to the optical combiner.

Optionally, the image is a light field image, and the display unit is a light field display unit comprising a multiscopic optical element that is employed to direct a first part and a second part of the synthetic light field towards a first eye and a second eye of an individual one of the at least one user, via the optical combiner, presenting a first image and a second image to the first eye and the second eye, respectively, wherein the method further comprises:
  obtaining the first image and the second image to be presented;
  for a given first region of the first image, determining an amount of crosstalk due to at least the second image;
  increasing a minimum intensity level of pixels in the first image; and adjusting first intensity values of pixels in the given first region of the first image, based on the amount of crosstalk determined for the given first region of the first image, wherein the step of obtaining the image comprises generating the light field image by utilising the first image and the second image.

Additionally, optionally, the method further comprises:

for the given first region of the first image, determine the corresponding first portion of the semi-reflective surface of the optical combiner from which light rays of the given first region of the first image are to be reflected towards the first eye of the individual one of the at least one user during display of the image, based on the relative position and orientation of the semi-reflective surface of the optical combiner with respect to the image plane of the display unit, and the position of the given first region in the first image;

for the corresponding first portion of the semi-reflective surface of the optical combiner from which the light rays of the given first region of the first image are to be reflected towards the first eye of the individual one of the at least one user, determining yet another secondary reflection intensity of light rays of the crosstalk, due to at least the second image, that are to undergo secondary reflection from a corresponding first portion of the another surface of the optical combiner; and adjusting the first intensity values of the pixels in the given first region of the first image, based further on the yet another secondary reflection intensity determined for the corresponding first portion of the semi-reflective surface of the optical combiner.

Likewise, optionally, the method further comprises:

for a given second region of the second image, determining an amount of crosstalk due to at least the first image;

increasing a minimum intensity level of pixels in the second image; and adjusting second intensity values of pixels in the given second region of the second image, based on the amount of crosstalk determined for the given second region of the second image.

Additionally, optionally, the method further comprises:

for the given second region of the second image, determine the corresponding second portion of the semi-reflective surface of the optical combiner from which light rays of the given second region of the second image are to be reflected towards the second eye of the individual one of the at least one user during display of the image, based on the relative position and orientation of the semi-reflective surface of the optical combiner with respect to the image plane of the display unit, and the position of the given second region in the second image;

for the corresponding second portion of the semi-reflective surface of the optical combiner from which the light rays of the given second region of the second image are to be reflected towards the second eye of the individual one of the at least one user, determining another secondary reflection intensity of light rays of the crosstalk, due to at least the first image, that are to undergo secondary reflection from a corresponding second portion of the another surface of the optical combiner; and adjusting the second intensity values of the pixels in the given second region of the second image, based further on the another secondary reflection intensity determined for the corresponding second portion of the semi-reflective surface of the optical combiner.

Moreover, optionally, the method further comprises:

capturing at least one real-world image of the real-world environment via at least one real-world-facing camera; and for the corresponding portion of the semi-reflective surface of the optical combiner, determining intensity values of pixels in a corresponding portion of the at least one real-world image, wherein the minimum intensity level of the pixels in the given region of the image is increased based on the intensity values of the pixels in the corresponding portion of the at least one real-world image.

Furthermore, optionally, the method further comprises:

capturing at least one real-world image of the real-world environment via the at least one real-world-facing camera;

for the corresponding portion of the semi-reflective surface of the optical combiner, determining intensity values of pixels in a corresponding portion of the at least one real-world image;

detecting, for the given region of the image, when the intensity values of the pixels in the corresponding portion of the at least one real-world image exceed at least one of: (a) a predefined threshold intensity value, (b) respective ones of the intensity values of the pixels in the given region of the image, (c) respective sums of the intensity values and a multiple of an amount by which the minimum intensity level is to be increased; and when it is detected, for the given region of the image, that the intensity values of the pixels in the corresponding portion of the at least one real-world image exceed at least one of: (a) the predefined threshold intensity value, (b) the respective ones of the intensity values of the pixels in the given region of the image, (c) the respective sums of the intensity values and the multiple of said amount, performing at least one of:

skipping determining the secondary reflection intensity;

skipping increasing the minimum intensity level of the pixels in the given region of the image;

reducing an amount by which the minimum intensity level is increased in at least one of: the given region of the image, a surrounding region of the given region in the image;

skipping adjusting the intensity values of the pixels in the given region of the image based on the secondary reflection intensity;

reducing the intensity values of the pixels in the given region of the image.

Moreover, optionally, the method further comprises:

determining gaze directions of the eyes of the at least one user, by utilising tracking means;

determining a focus depth at which the at least one user is gazing, based on the gaze directions of the eyes;

detecting when a difference between the focus depth and an optical depth at which at least one virtual object is being presented via the synthetic light field is greater than a predefined threshold difference; and when it is detected that said difference is greater than the predefined threshold difference, performing at least one of:

skipping determining the secondary reflection intensity;

skipping or attenuating increasing the minimum intensity level of the pixels in the image;

skipping or attenuating adjusting the intensity values of the pixels in the given region of the image based on the secondary reflection intensity.

Furthermore, optionally, the method further comprises:

determining gaze directions of the eyes of the at least one user, by utilising the tracking means;

detecting, based on the gaze directions of the eyes, when the at least one user is not gazing through the corresponding portion of the semi-reflective surface of the optical combiner; and when it is detected that the at least one user is not gazing through the corresponding portion of the semi-reflective surface of the optical combiner, performing at least one of:

skipping determining the secondary reflection intensity;

skipping or attenuating increasing the minimum intensity level of the pixels in the image;

skipping or attenuating adjusting the intensity values of the pixels in the given region of the image based on the secondary reflection intensity.

Moreover, optionally, the method further comprises:

capturing at least one real-world image of the real-world environment via the at least one real-world-facing camera; and for the corresponding portion of the semi-reflective surface of the optical combiner, determining intensity values of pixels in a corresponding portion of the at least one real-world image, wherein the minimum intensity level of the pixels in the image is increased on a per-region basis, wherein the step of increasing the minimum intensity level of the pixels in the given region of the image comprises:

detecting when the given region of the image presents at least a part of at least one virtual object, and when the intensity values of the pixels in the corresponding portion of the at least one real-world image exceed respective sums of the intensity values of the pixels in the given region of the image and a multiple of an amount by which the minimum intensity level is to be increased; and when it is detected that the given region of the image presents at least a part of at least one virtual object, and the intensity values of the pixels in the corresponding portion of the at least one real-world image exceed the respective sums of the intensity values of the pixels in the given region of the image and the multiple of said amount, performing any one of:

selectively skipping increasing the minimum intensity level of those pixels in the given region of the image that present at least the part of the at least one virtual object;

increasing the minimum intensity level of those pixels in the given region of the image that present at least the part of the at least one virtual object by a given amount that is smaller than another amount by which the minimum intensity level of remaining pixels in the given region of the image is increased.

DETAILED DESCRIPTION OF THE DRAWINGS

Figure 1B:
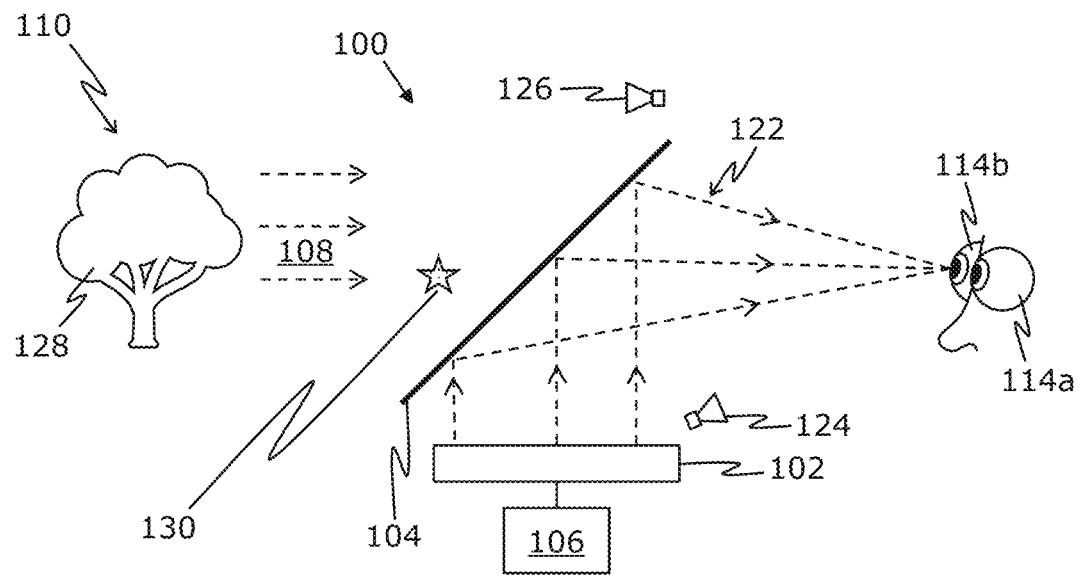

FIGS. 1A and 1B are schematic illustrations of a system 100 for augmenting reality that incorporates secondary reflection compensation, in accordance with an embodiment of the present disclosure. The system 100 comprises a display unit 102, an optical combiner 104, and at least one processor depicted as a processor 106. The optical combiner 104 is arranged on an optical path of the display unit 102 and on an optical path of a real-world light field 108 of a real-world environment 110. The optical combiner 104 has a semi-reflective surface 112 that faces eyes 114a-114b of at least one user, and another surface 116 that is opposite to the semi-reflective surface 112. The processor 106 is configured to:

obtain an image to be displayed;

obtain a relative location of the eyes 114a-114b of the at least one user with respect to the semi-reflective surface 112 of the optical combiner 104;

for a given region 118 of the image, determine a corresponding portion A of the semi-reflective surface 112 of the optical combiner 104 from which light rays of the given region 118 of the image are to be reflected towards the eyes 114a-114b of the at least one user during display of the image via the display unit 102, based on a relative position and orientation of the semi-reflective surface 112 of the optical combiner 104 with respect to an image plane of the display unit 102, a position of the given region 118 in the image, and the relative location of the eyes 114a-114b of the at least one user with respect to the semi-reflective surface 112 of the optical combiner 104;

for the corresponding portion A of the semi-reflective surface 112 of the optical combiner 104, determine a secondary reflection intensity of light rays of another region 120 of the image that are to undergo secondary reflection from a corresponding portion B of another surface 116 of the optical combiner 104;

increase a minimum intensity level of pixels in the image;

adjust intensity values of pixels in the given region 118 of the image, based on the secondary reflection intensity determined for the corresponding portion A of the semi-reflective surface 112 of the optical combiner 104; and display the image via the display unit 102 for producing a synthetic light field 122, wherein the optical combiner 104 is employed to reflect the synthetic light field 122 towards the eyes 114a-114b of the at least one user, whilst optically combining the synthetic light field 122 with the real-world light field 108.

Optionally, the system 100 further comprises tracking means 124. Optionally, the system 100 further comprises at least one real-world-facing camera depicted as a real-world-facing camera 126. Optionally, in this regard, the processor 106 is configured to:

capture at least one real-world image of the real-world environment 110 via the real-world-facing camera 126; and for the corresponding portion A of the semi-reflective surface 112 of the optical combiner 104, determine intensity values of pixels in a corresponding portion of the at least one real-world image, wherein the minimum intensity level of the pixels in the given region 118 of the image is increased based on the intensity values of the pixels in the corresponding portion of the at least one real-world image.

The real-world environment 110 has at least one real-world object, depicted as a real-world object 128 (shown as a tree, for illustration purposes only). The synthetic light field 122 presents at least one virtual object depicted as a virtual object 130 (shown as a star, for illustration purposes only). For illustration purposes only, the virtual object 130 is shown to be presented at an optical depth that is much smaller than another optical depth at which the real-world object 128 is present. Optionally, in such a case, a defocus blur is applied on the at least one real-world image of the real-world environment 110, prior to determining the intensity values of the pixels in the corresponding portion of the at least one real-world image.

It may be understood by a person skilled in the art that FIGS. 1A and 1B depict a simplified example implementation of the system 100, for sake of clarity, which should not unduly limit the scope of the claims herein. It is to be understood that a specific implementation of the system 100 is not to be construed as limiting it to specific numbers or types of display units, optical combiners and processors. A person skilled in the art will recognize many variations, alternatives, and modifications of embodiments of the present disclosure.

Figure 2:
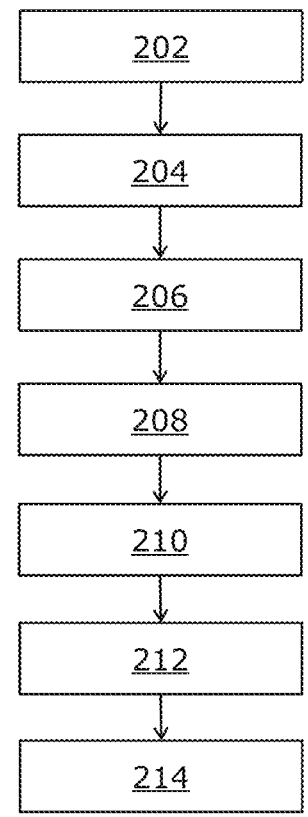
FIG. 2 illustrates steps of a method for augmenting reality that incorporates secondary reflection compensation, in accordance with an embodiment of the present disclosure.

Referring to FIG. 2, illustrated are steps of a method for augmenting reality that incorporates secondary reflection compensation, in accordance with an embodiment of the present disclosure. At step 202, an image to be displayed is obtained. At step 204, a relative location of eyes of at least one user with respect to a semi-reflective surface of an optical combiner is obtained. At step 206, for a given region of the image, a corresponding portion of a semi-reflective surface of an optical combiner from which light rays of the given region of the image are to be reflected towards the eyes of the at least one user during display of the image via a display unit is determined, based on a relative position and orientation of the semi-reflective surface of the optical combiner with respect to an image plane of the display unit, and a position of the given region in the image, and the relative location of the eyes of the at least one user with respect to the semi-reflective surface of the optical combiner, wherein the optical combiner is arranged on an optical path of the display unit and on an optical path of a real-world light field of a real-world environment. At step 208, for the corresponding portion of the semi-reflective surface of the optical combiner, a secondary reflection intensity of light rays of another region of the image that are to undergo secondary reflection from a corresponding portion of another surface of the optical combiner is determined, the another surface being opposite to the semi-reflective surface. At step 210, a minimum intensity level of pixels in the image is increased. At step 212, intensity values of pixels in the given region of the image is adjusted, based on the secondary reflection intensity determined for the corresponding portion of the semi-reflective surface of the optical combiner. At step 214, the image is displayed via the display unit for producing a synthetic light field, wherein the optical combiner is employed to reflect the synthetic light field towards the eyes of the at least one user, whilst optically combining the synthetic light field with the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:
a display unit;
an optical combiner arranged on an optical path of the display unit and on an optical path of a real-world light field of a real-world environment; and
at least one processor configured to:
obtain an image to be displayed;
obtain a relative location of eyes of at least one user with respect to a semi-reflective surface of the optical combiner;
for a given region of the image, determine a corresponding portion of the semi-reflective surface of the optical combiner from which light rays of the given region of the image are to be reflected towards the eyes of the at least one user during display of the image, based on a relative position and orientation of the semi-reflective surface of the optical combiner with respect to an image plane of the display unit, a position of the given region in the image, and the relative location of the eyes of the at least one user with respect to the semi-reflective surface of the optical combiner;
for the corresponding portion of the semi-reflective surface of the optical combiner, determine a secondary reflection intensity of light rays of another region of the image that are to undergo secondary reflection from a corresponding portion of another surface of the optical combiner, the another surface being opposite to the semi-reflective surface;
increase a minimum intensity level of pixels in the image;
adjust intensity values of pixels in the given region of the image, based on the secondary reflection intensity determined for the corresponding portion of the semi-reflective surface of the optical combiner; and
display the image via the display unit for producing a synthetic light field, wherein the optical combiner is employed to reflect the synthetic light field towards the eyes of the at least one user, whilst optically combining the synthetic light field with the real-world light field.

2. The system of claim 1, wherein the at least one processor is configured to:
determine a viewing direction from a given eye of an individual one of the at least one user to the corresponding portion of the semi-reflective surface of the optical combiner, based on a relative location of the given eye with respect to the optical combiner, and a position of the corresponding portion of the semi-reflective surface in the optical combiner;
determine the corresponding portion of the another surface of the optical combiner, based on the viewing direction from the given eye to the corresponding portion of the semi-reflective surface of the optical combiner; and
determine the another region of the image whose light rays are to undergo the secondary reflection from the corresponding portion of the another surface of the optical combiner towards the given eye, based on the relative position and orientation of the semi-reflective surface of the optical combiner with respect to the image plane of the display unit, a cross-sectional geometry of the optical combiner, and the relative location of the given eye with respect to the optical combiner.

3. The system of claim 1, wherein the image is a light field image, and the display unit is a light field display unit comprising a multiscopic optical element that is employed to direct a first part and a second part of the synthetic light field towards a first eye and a second eye of an individual one of the at least one user, via the optical combiner, presenting a first image and a second image to the first eye and the second eye, respectively, wherein the at least one processor is configured to:
obtain the first image and the second image to be presented;

for a given first region of the first image, determine an amount of crosstalk due to at least the second image;
increase a minimum intensity level of pixels in the first image; and
adjust first intensity values of pixels in the given first region of the first image, based on the amount of crosstalk determined for the given first region of the first image,
wherein when obtaining the image, the at least one processor is configured to generate the light field image by utilising the first image and the second image.

4. The system of claim 3, wherein the at least one processor is configured to:
for a given second region of the second image, determine an amount of crosstalk due to at least the first image;
increase a minimum intensity level of pixels in the second image; and
adjust second intensity values of pixels in the given second region of the second image, based on the amount of crosstalk determined for the given second region of the second image.

5. The system of claim 4, wherein the at least one processor is configured to:
for the given second region of the second image, determine a corresponding second portion of the semi-reflective surface of the optical combiner from which light rays of the given second region of the second image are to be reflected towards the second eye of the individual one of the at least one user during display of the image, based on the relative position and orientation of the semi-reflective surface of the optical combiner with respect to the image plane of the display unit, and a position of the given second region in the second image;
for the corresponding second portion of the semi-reflective surface of the optical combiner from which the light rays of the given second region of the second image are to be reflected towards the second eye of the individual one of the at least one user, determine another secondary reflection intensity of light rays of the crosstalk, due to at least the first image, that are to undergo secondary reflection from a corresponding second portion of the another surface of the optical combiner; and
adjust the second intensity values of the pixels in the given second region of the second image, based further on the another secondary reflection intensity determined for the corresponding second portion of the semi-reflective surface of the optical combiner.

6. The system of claim 3, wherein the at least one processor is configured to:
for the given first region of the first image, determine a corresponding first portion of the semi-reflective surface of the optical combiner from which light rays of the given first region of the first image are to be reflected towards the first eye of the individual one of the at least one user during display of the image, based on the relative position and orientation of the semi-reflective surface of the optical combiner with respect to the image plane of the display unit, and a position of the given first region in the first image;
for the corresponding first portion of the semi-reflective surface of the optical combiner from which the light rays of the given first region of the first image are to be reflected towards the first eye of the individual one of the at least one user, determine yet another secondary reflection intensity of light rays of the crosstalk, due to at least the second image, that are to undergo secondary reflection from a corresponding first portion of the another surface of the optical combiner; and
adjust the first intensity values of the pixels in the given first region of the first image, based further on the yet another secondary reflection intensity determined for the corresponding first portion of the semi-reflective surface of the optical combiner.

7. The system of claim 1, further comprising at least one real-world-facing camera, wherein the at least one processor is configured to:
capture at least one real-world image of the real-world environment via the at least one real-world-facing camera; and
for the corresponding portion of the semi-reflective surface of the optical combiner, determine intensity values of pixels in a corresponding portion of the at least one real-world image,
wherein the minimum intensity level of the pixels in the given region of the image is increased based on the intensity values of the pixels in the corresponding portion of the at least one real-world image.

8. The system of claim 1, further comprising at least one real-world-facing camera, wherein the at least one processor is configured to:
capture at least one real-world image of the real-world environment via the at least one real-world-facing camera;
for the corresponding portion of the semi-reflective surface of the optical combiner, determine intensity values of pixels in a corresponding portion of the at least one real-world image;
detect, for the given region of the image, when the intensity values of the pixels in the corresponding portion of the at least one real-world image exceed at least one of: a predefined threshold intensity value, respective ones of the intensity values of the pixels in the given region of the image, respective sums of the intensity values and a multiple of an amount by which the minimum intensity level is to be increased; and
when it is detected, for the given region of the image, that the intensity values of the pixels in the corresponding portion of the at least one real-world image exceed at least one of: the predefined threshold intensity value, the respective ones of the intensity values of the pixels in the given region of the image, the respective sums of the intensity values and the multiple of said amount, perform at least one of:
skip determining the secondary reflection intensity;
skip increasing the minimum intensity level of the pixels in the given region of the image;
reduce an amount by which the minimum intensity level is increased in at least one of: the given region of the image, a surrounding region of the given region in the image;
skip adjusting the intensity values of the pixels in the given region of the image based on the secondary reflection intensity;
reduce the intensity values of the pixels in the given region of the image.

9. The system of claim 1, further comprising tracking means, wherein the at least one processor is configured to:
determine gaze directions of the eyes of the at least one user, by utilising the tracking means;
determine a focus depth at which the at least one user is gazing, based on the gaze directions of the eyes;

detect when a difference between the focus depth and an optical depth at which at least one virtual object is being presented via the synthetic light field is greater than a predefined threshold difference; and when it is detected that said difference is greater than the predefined threshold difference, perform at least one of:
skip determining the secondary reflection intensity;
skip or attenuate increasing the minimum intensity level of the pixels in the image;
skip or attenuate adjusting the intensity values of the pixels in the given region of the image based on the secondary reflection intensity.

10. The system of claim 1, further comprising tracking means, wherein the at least one processor is configured to:
determine gaze directions of the eyes of the at least one user, by utilising the tracking means;
detect, based on the gaze directions of the eyes, when the at least one user is not gazing through the corresponding portion of the semi-reflective surface of the optical combiner; and
when it is detected that the at least one user is not gazing through the corresponding portion of the semi-reflective surface of the optical combiner, perform at least one of:
skip determining the secondary reflection intensity;
skip or attenuate increasing the minimum intensity level of the pixels in the image;
skip or attenuate adjusting the intensity values of the pixels in the given region of the image based on the secondary reflection intensity.

11. The system of claim 1, further comprising at least one real-world-facing camera, wherein the at least one processor is configured to:
capture at least one real-world image of the real-world environment via the at least one real-world-facing camera; and
for the corresponding portion of the semi-reflective surface of the optical combiner, determine intensity values of pixels in a corresponding portion of the at least one real-world image,
wherein the minimum intensity level of the pixels in the image is increased on a per-region basis, and wherein when increasing the minimum intensity level of the pixels in the given region of the image, the at least one processor is configured to:
detect when the given region of the image presents at least a part of at least one virtual object, and when the intensity values of the pixels in the corresponding portion of the at least one real-world image exceed respective sums of the intensity values of the pixels in the given region of the image and a multiple of an amount by which the minimum intensity level is to be increased; and
when it is detected that the given region of the image presents at least a part of at least one virtual object, and the intensity values of the pixels in the corresponding portion of the at least one real-world image exceed the respective sums of the intensity values of the pixels in the given region of the image and the multiple of said amount, perform any one of:
selectively skip increasing the minimum intensity level of those pixels in the given region of the image that present at least the part of the at least one virtual object;
increase the minimum intensity level of those pixels in the given region of the image that present at least the part of the at least one virtual object by a given amount that is smaller than another amount by which the minimum intensity level of remaining pixels in the given region of the image is increased.

12. A method comprising:
obtaining an image to be displayed;
obtaining a relative location of eyes of at least one user with respect to a semi-reflective surface of an optical combiner;
for a given region of the image, determining a corresponding portion of the semi-reflective surface of the optical combiner from which light rays of the given region of the image are to be reflected towards the eyes of the at least one user during display of the image via a display unit, based on a relative position and orientation of the semi-reflective surface of the optical combiner with respect to an image plane of the display unit, a position of the given region in the image, and the relative location of the eyes of the at least one user with respect to the semi-reflective surface of the optical combiner, wherein the optical combiner is arranged on an optical path of the display unit and on an optical path of a real-world light field of a real-world environment;
for the corresponding portion of the semi-reflective surface of the optical combiner, determining a secondary reflection intensity of light rays of another region of the image that are to undergo secondary reflection from a corresponding portion of another surface of the optical combiner, the another surface being opposite to the semi-reflective surface;
increasing a minimum intensity level of pixels in the image;
adjusting intensity values of pixels in the given region of the image, based on the secondary reflection intensity determined for the corresponding portion of the semi-reflective surface of the optical combiner; and
displaying the image via the display unit for producing a synthetic light field, wherein the optical combiner is employed to reflect the synthetic light field towards the eyes of the at least one user, whilst optically combining the synthetic light field with the real-world light field.

13. The method of claim 12, further comprising:
determining a viewing direction from a given eye of an individual one of the at least one user to the corresponding portion of the semi-reflective surface of the optical combiner, based on a relative location of the given eye with respect to the optical combiner, and a position of the corresponding portion of the semi-reflective surface in the optical combiner;
determining the corresponding portion of the another surface of the optical combiner, based on the viewing direction from the given eye to the corresponding portion of the semi-reflective surface of the optical combiner; and
determining the another region of the image whose light rays are to undergo the secondary reflection from the corresponding portion of the another surface of the optical combiner towards the given eye, based on the relative position and orientation of the semi-reflective surface of the optical combiner with respect to the image plane of the display unit, a cross-sectional geometry of the optical combiner, and the relative location of the given eye with respect to the optical combiner.

14. The method of claim 12, wherein the image is a light field image, and the display unit is a light field display unit comprising a multiscopic optical element that is employed to direct a first part and a second part of the synthetic light field towards a first eye and a second eye of an individual one of the at least one user, via the optical combiner, presenting a first image and a second image to the first eye and the second eye, respectively, wherein the method further comprises:
   obtaining the first image and the second image to be presented;
   for a given first region of the first image, determining an amount of crosstalk due to at least the second image;
   increasing a minimum intensity level of pixels in the first image; and
   adjusting first intensity values of pixels in the given first region of the first image, based on the amount of crosstalk determined for the given first region of the first image,
wherein the step of obtaining the image comprises generating the light field image by utilising the first image and the second image.

15. The method of claim 14, further comprising:
   for the given first region of the first image, determining a corresponding first portion of the semi-reflective surface of the optical combiner from which light rays of the given first region of the first image are to be reflected towards the first eye of the individual one of the at least one user during display of the image, based on the relative position and orientation of the semi-reflective surface of the optical combiner with respect to the image plane of the display unit, and a position of the given first region in the first image;
   for the corresponding first portion of the semi-reflective surface of the optical combiner from which the light rays of the given first region of the first image are to be reflected towards the first eye of the individual one of the at least one user, determining yet another secondary reflection intensity of light rays of the crosstalk, due to at least the second image, that are to undergo secondary reflection from a corresponding first portion of the another surface of the optical combiner; and
   adjusting the first intensity values of the pixels in the given first region of the first image, based further on the yet another secondary reflection intensity determined for the corresponding first portion of the semi-reflective surface of the optical combiner.

16. The method of claim 12, further comprising:
   capturing at least one real-world image of the real-world environment via at least one real-world-facing camera; and
   for the corresponding portion of the semi-reflective surface of the optical combiner, determining intensity values of pixels in a corresponding portion of the at least one real-world image,
wherein the minimum intensity level of the pixels in the given region of the image is increased based on the intensity values of the pixels in the corresponding portion of the at least one real-world image.

17. The method of claim 12, further comprising:
   capturing at least one real-world image of the real-world environment via the at least one real-world-facing camera;
   for the corresponding portion of the semi-reflective surface of the optical combiner, determining intensity values of pixels in a corresponding portion of the at least one real-world image;
   detecting, for the given region of the image, when the intensity values of the pixels in the corresponding portion of the at least one real-world image exceed at least one of: a predefined threshold intensity value, respective ones of the intensity values of the pixels in the given region of the image, respective sums of the intensity values and a multiple of an amount by which the minimum intensity level is to be increased; and
   when it is detected, for the given region of the image, that the intensity values of the pixels in the corresponding portion of the at least one real-world image exceed at least one of: the predefined threshold intensity value, the respective ones of the intensity values of the pixels in the given region of the image, the respective sums of the intensity values and the multiple of said amount, performing at least one of:
      skipping determining the secondary reflection intensity;
      skipping increasing the minimum intensity level of the pixels in the given region of the image;
      reducing an amount by which the minimum intensity level is increased in at least one of: the given region of the image, a surrounding region of the given region in the image;
      skipping adjusting the intensity values of the pixels in the given region of the image based on the secondary reflection intensity;
      reducing the intensity values of the pixels in the given region of the image.

18. The method of claim 12, further comprising:
   determining gaze directions of the eyes of the at least one user, by utilising tracking means;
   determining a focus depth at which the at least one user is gazing, based on the gaze directions of the eyes;
   detecting when a difference between the focus depth and an optical depth at which at least one virtual object is being presented via the synthetic light field is greater than a predefined threshold difference; and
   when it is detected that said difference is greater than the predefined threshold difference, performing at least one of:
      skipping determining the secondary reflection intensity;
      skipping or attenuating increasing the minimum intensity level of the pixels in the image;
      skipping or attenuating adjusting the intensity values of the pixels in the given region of the image based on the secondary reflection intensity.

19. The method of claim 12, further comprising:
   determining gaze directions of the eyes of the at least one user, by utilising tracking means;
   detecting, based on the gaze directions of the eyes, when the at least one user is not gazing through the corresponding portion of the semi-reflective surface of the optical combiner; and
   when it is detected that the at least one user is not gazing through the corresponding portion of the semi-reflective surface of the optical combiner, performing at least one of:
      skipping determining the secondary reflection intensity;
      skipping or attenuating increasing the minimum intensity level of the pixels in the image;
      skipping or attenuating adjusting the intensity values of the pixels in the given region of the image based on the secondary reflection intensity.

20. The method of claim 12, further comprising:
   capturing at least one real-world image of the real-world environment via the at least one real-world-facing camera; and
   for the corresponding portion of the semi-reflective surface of the optical combiner, determining intensity values of pixels in a corresponding portion of the at least one real-world image, wherein the minimum intensity level of the pixels in the image is increased on a per-region basis, and wherein the step of increasing the minimum intensity level of the pixels in the given region of the image comprises:

detecting when the given region of the image presents at least a part of at least one virtual object, and when the intensity values of the pixels in the corresponding portion of the at least one real-world image exceed respective sums of the intensity values of the pixels in the given region of the image and a multiple of an amount by which the minimum intensity level is to be increased; and when it is detected that the given region of the image presents at least a part of at least one virtual object, and the intensity values of the pixels in the corresponding portion of the at least one real-world image exceed the respective sums of the intensity values of the pixels in the given region of the image and the multiple of said amount, performing any one of:

selectively skipping increasing the minimum intensity level of those pixels in the given region of the image that present at least the part of the at least one virtual object;

increasing the minimum intensity level of those pixels in the given region of the image that present at least the part of the at least one virtual object by a given amount that is smaller than another amount by which the minimum intensity level of remaining pixels in the given region of the image is increased.

* * * * *